United States Patent [19]

Funakoshi et al.

[11] 4,447,593

[45] May 8, 1984

[54] MELT-ANISOTROPIC WHOLLY AROMATIC POLYESTER AND FIBERS OR FILMS THEREOF

[75] Inventors: Wataru Funakoshi; Takanori Urasaki, both of Iwakuni, Japan

[73] Assignee: Teijin Limited, Osaka, Japan

[21] Appl. No.: 408,847

[22] Filed: Aug. 17, 1982

[30] Foreign Application Priority Data

Aug. 18, 1981 [JP] Japan .................................. 56-128234
Sep. 11, 1981 [JP] Japan .................................. 56-142406

[51] Int. Cl.$^3$ ...................... C08G 63/18; C08G 63/60
[52] U.S. Cl. ................................... 528/176; 528/190; 528/191; 528/193; 528/194
[58] Field of Search ............... 528/176, 190, 191, 193, 528/194

[56] References Cited

U.S. PATENT DOCUMENTS

| | | | |
|---|---|---|---|
| 3,991,013 | 11/1976 | Pletcher | 528/193 |
| 4,083,829 | 4/1978 | Calundann et al. | 528/193 |
| 4,238,600 | 12/1980 | Jackson, Jr. et al. | 528/190 |
| 4,242,496 | 12/1980 | Jackson, Jr. et al. | 528/176 |
| 4,284,757 | 8/1981 | Fayolle | 528/191 |
| 4,311,824 | 1/1982 | Fayolle | 528/193 |
| 4,360,658 | 11/1982 | Jackson, Jr. et al. | 528/193 |

Primary Examiner—Lester L. Lee

Attorney, Agent, or Firm—Sherman & Shalloway

[57] ABSTRACT

A fiber- or film-forming wholly aromatic polyester having melt anisotropy, said polyester consisting essentially of (1) units (a) derived from an aromatic dicarboxylic acid at least 90 mole % of which consists of a p-oriented aromatic dicarboxylic acid and units (b) derived from an aromatic dihydroxy compound at least about 90 mole % of which consists of a mono-substituted hydroquinone ring-substituted by an alkyl group having at least 5 carbon atoms or an aralkyl group having at least 7 carbon atoms or a mixture of said mono-substituted hydroquinone and unsubstituted hydroquinone or a substituted hydroquinone other than said mono-substituted hydroquinone, the proportion of said mono-substituted hydroquinone being at least 80 mole %; or (2) said units (a) and (b), and units (c) derived from a p-oriented aromatic hydroxycarboxylic acid at least about 70 mole % of which consists of p-hydroxybenzoic acid and/or a mono-substituted p-hydroxybenzoic acid, the proportion of the units derived from the p-oriented aromatic dicarboxylic acid and the units derived from the mono-substituted hydroquinone being at least about 9 mole % based on the entire structural units of the polyester; a process for production thereof; and fibers or films prepared therefrom.

17 Claims, No Drawings

MELT-ANISOTROPIC WHOLLY AROMATIC POLYESTER AND FIBERS OR FILMS THEREOF

This invention relates to a wholly aromatic polyester having melt anisotropy, a process for production thereof, and fibers or films prepared therefrom.

More specifically, this invention relates to a melt-anisotropic wholly aromatic polyester comprising units derived from a mono-substituted hydroquinone ring-substituted by a specified substituent. Despite its melt anisotropy, this novel wholly aromatic polyester can be easily melt-shaped from its optically anisotropic melt to give shaped articles such as fibers or films having excellent mechanical properties.

Polyethylene terephthalate has long found extensive use as a material for fibers, films, plastics, etc. because of its high mechanical strength and excellent heat stability and chemical resistance. Polyethylene terephthalate fibers, however, have not proved to be fully satisfactory in applications requiring high strength and a high Young's modulus, such as in industrial applications as, for example, tire cords.

Aromatic polyamides such as poly(p-phenylene terephthalamide) and poly(p-benzamide) are known as material for forming fibers of a very high Young's modulus, and strength. While polyethylene terephthalate can be easily fiberized by melt-spinning, the aromatic polyamides are difficult to melt-spin, and in practice, shaping of these aromatic polyamides has to rely on solution spinning (dry or wet spinning). Hence, the recovery of solvent is necessary, and the form of the shaped products is limited by shaping methods, for example to fibers. For industrial practice, the solution spinning still has several drawbacks.

In an attempt to overcome these drawbacks, wholly aromatic copolyesters derived from an aromatic hydroxycarboxylic acid, an aromatic dihydroxy compound and an aromatic dicarboxylic acid such as terephthalic acid and isophthalic acid and fibers thereof were proposed (see U.S. Pat. No. 3,975,487). According to this prior technique, a wholly aromatic polyester comprising terephthalic acid, which is p-oriented, as the dicarboxylic acid component has a very high melting point, and its melt-shaping, for example its melt-spinning, is difficult. Hence, it is difficult to produce shaped articles, such as fibers, having a high strength and a high Young's modulus industrially and efficiently. On the other hand, U.S. Pat. No. 4,011,199 discloses that a wholly aromatic polyester comprising isophthalic acid, which is not p-oriented, as the dicarboxylic acid component has the advantage that its melt viscosity is much lower than the aforesaid wholly aromatic polyester comprising terephthalic acid, and it can be melt-shaped. But since it has no melt anisotropy, melt-shaping alone cannot convert it into shaped articles such as fibers or films having excellent mechanical properties such as a high Young's modulus. The specification of the above-cited patent discloses butylhydroquinone as the aromatic dihydroxy compound, but neither discloses nor suggests a wholly aromatic polyester comprising butylhydroquinone and a method for its production.

An optically and anisotropic wholly aromatic polyester is known which comprises terephthalic acid or 2,6-naphthalenedicarboxylic acid as a dicarboxylic acid component and phenylhydroquinone or substituted phenylhydroquinone as an aromatic dihydroxy compound (see U.S. Pat. Nos. 4,159,365 and 4,153,779). The specification of U.S. Pat. No. 4,159,365 discloses that fibers from a wholly aromatic polyester obtained by using unsubstituted phenylhydroquinone have the advantage of possessing good tenacity retention at high temperatures. The specification of Japanese Laid-Open Patent Publication No. 84718/1981 discloses a wholly aromatic polyester comprising unsubstituted phenylhydroquinone and hydroquinone as main aromatic dihydroxy compounds. These wholly aromatic polyesters are characterized by having relatively high melting points despite the use of relatively large (50 to 30 mol% based on the entire hydroxy components) of hydroquinones, and being only sparingly soluble in organic solvents.

It is an object of this invention to provide a novel wholly aromatic polyester having melt anisotropy.

Another object of this invention is to provide a novel wholly aromatic polyester having melt anisotropy which in spite of its melt anisotropy, has a relatively low melting point and a relatively low flow initiation temperature, and can be easily melt-shaped from its optically anisotropic melt.

Still another object of this invention is to provide a wholly aromatic polyester which can be shaped both from its melt and solution and has excellent solubility in organic solvents, and therefore has such excellent shapability that its properties can be controlled depending upon the method of shaping.

Still another object of this invention is to provide a wholly aromatic polyester which is easy to melt-shape and has excellent resistance to organic and inorganic chamicals.

Still another object of this invention is to provide a novel wholly aromatic polyester which can give shaped articles having excellent mechanical properties such as strength and a Young's modulus by melt shaping.

Still another object of this invention is to provide a wholly aromatic polyester having excellent heat stability, which gives shaped articles having a high percent retention of mechanical properties at high temperatures.

Still another object of this invention is to provide a wholly aromatic polyester which has a relatively low melting point and a relatively low flow initiation temperature and therefore can be melt-shaped at relatively low temperatures to give shaped articles having excellent properties while minimizing heat degradation and oxidative degradation during shaping.

Still another object of this invention is to provide a wholly aromatic polyester of a high degree of polymerization, which has a relatively low melting point and a relatively low flow initiation temperature and therefore can be produced at a relatively low polymerization temperature while minimizing heat degradation and oxidative degradation during polymer formation.

A further object of this invention is to provide fibers or films having excellent mechanical properties formed from the aforesaid wholly aromatic polyesters.

According to this invention, these objects and advantages of this invention are achieved by a fiber- or film-forming wholly aromatic polyester having melt anisotropy, said polyester consisting essentially of (a) units derived from an aromatic dicarboxylic acid at least about 90 mole% of which consists of a p-oriented aromatic dicarboxylic acid and (b) units derived from an aromatic dihydroxy compound at least about 90 mole% of which consists of a mono-substituted hydroquinone ring-substituted by an alkyl group having at least 5 carbon atoms or an aralkyl group having at least 7 carbon atoms or a mixture of said mono-substituted hydroquinone and unsubstituted hydroquinone or a substituted hydroquinone other than said mono-substituted hydroquinone, the proportion of said mono-substituted hydroquinone being at least 80 mole%; or said units (a) and (b) and (c) units derived from a p-oriented aromatic hydroxycarboxylic acid at least about 70 mole% of which consists of p-hydroxybenzoic acid and/or a mono-substituted p-hydroxybenzoic acid, the proportion of the units derived from the p-oriented aromatic dicarboxylic acid and the units derived from the mono-substituted hydroquinone being at least about 9 mole% based on the entire structural units of the polyester.

The wholly aromatic polyester of the invention having melt anisotropy basically includes a polyester consisting essentially of the units (a) derived from an aromatic dicarboxylic acid and the units (b) derived from an aromatic dihydroxy compound, and a polyester consisting essentially of the units (a) and (b) and the units (c) derived from a p-oriented aromatic hydroxycarboxylic acid. The latter differs from the former in that it contains the p-oriented aromatic hydroxycarboxylic acid as a main component. They are common in that they contain the units (a) and (b), particularly the units derived from a mono-substituted hydroquinone ring-substituted by an alkyl group having at least 5 carbon atoms or an aralkyl group having at least 7 carbon atoms and they have molecular chains having excellent linearity and give optically anisotropic melts.

Units derived from the p-oriented aromatic dicarboxylic acid account for at least about 90 mole% of the units (a) derived from the aromatic dicarboxylic acid forming the wholly aromatic polyester of this invention. The p-oriented aromatic dicarboxylic acid denotes an aromatic dicarboxylic acid in which the two carboxyl groups bonded to the aromatic ring are arranged at coaxially opposite positions on the aromatic ring as in 1,4-phenylene, 1,4-naphthylene or 4,4'-diphenylene, or at parallelly opposite or symmetrical positions of an aromatic ring consisting of benzene rings directly bonded or fused as in 1,5-naphthylene, 2,6-naphthylene or 3,3'-(or 3,5'-)diphenylene.

Examples of the p-oriented aromatic dicarboxylic acid include terephthalic acids such as terephthalic acid, chloroterephthalic acid, bromoterephthalic acid, 2,5-dibromoterephthalic acid and methylterephthalic acid; naphthalenedicarboxylic acids such as 1,4-naphthalenedicarboxylic acid, 1,5-naphthalenedicarboxylic acid and 2,6-naphthalenedicarboxylic acid; and 4,4'-diphenyldicarboxylic acid, 3,3'-diphenyldicarboxylic acid and 3,3'-dibromo-4,4'-diphenyldicarboxylic acid. They may be used either singly or as a mixture of two or more. Of these, the terephthalic acids, especially terephthalic acid, are preferred.

Preferably, the units (a) derived from the aromatic dicarboxylic acid consist essentially of units derived from the p-oriented aromatic dicarboxylic acid. They may contain up to about 10 mole% of units derived from a m-oriented aromatic dicarboxylic acid or an aromatic dicarboxylic acid in which a plurality of benzene rings are bonded through a hetero atom, etc.

The m-oriented aromatic dicarboxylic acid denotes an aromatic dicarboxylic acid in which the two carboxyl groups bonded to the aromatic ring are not adjacent to each other on the aromatic ring nor are arranged coaxially or pallelly at opposite positions on the aromatic ring, as in 1,3-phenylene or 1,3-, 1,6-, 1,7- or 2,7-naphthylene, or 3,4-diphenylene.

Examples of the m-oriented aromatic dicarboxylic acid include isophthalic acid, 1,3-naphthalenedicarboxylic acid, 1,6-naphthalenedicarboxylic acid, 1,7-naphthalenedicarboxylic acid, 2,7-naphthalenedicarboxylic acid, 3,4'-diphenyldicarboxylic acid, 4-methylisophthalic acid, 5-methylisophthalic acid, 5-tert-butylisophthalic acid, 5-methoxyisophthalic acid and naphthalene-2,7-dichloro-1,6-dicarboxylic acid.

Examples of the aromatic dicarboxylic acid in which a plurality of benzene rings are bonded through a hetero atom, etc. include diphenyl ether-4,4'-dicarboxylic acid, diphenyl ether-3,4'-dicarboxylic acid, diphenoxyethane-4,4'-dicarboxylic acid, diphenoxyethane-3,4'-dicarboxylic acid, and diphenyl ether-4,4'-dichloro-3,3'-dicarboxylic acid.

Of these, isophthalic acid, diphenyl ether-4,4'-carboxylic acid and diphenoxyethane-4,4'-dicarboxylic acid are preferred.

The units (b) derived from the aromatic dihydroxy compound forming the wholly aromatic polyester of this invention contain at least about 90 mole% of units derived from a mono-substituted hydroquinone ring-substituted by an alkyl group having at least 5 carbon atoms or an aralkyl group having at least 7 carbon atoms, or a mixture of at least about 80 mole% of the units derived from the mono-substituted hydroquinone and at least about 10 mole% of units derived from unsubstituted hydroquinone or a substituted hydroquinone other than the mono-substituted hydroquinone.

The alkyl group having at least 5 carbon atoms is preferably an alkyl group having 5 to 10 carbon atoms, and the aralkyl group having at least 7 carbon atoms is preferably an aralkyl group having 7 to 15 carbon atoms. More preferably, the alkyl group or aralkyl group is bonded to the hydroquinone skeleton through a tertiary carbon atom.

The wholly aromatic polyester of this invention which contains units derived from a substituted hydroquinone having such a substituent bonded to the hydroquinone skeleton through a tertiary carbon atom has excellent oxidation stability and solvent resistance at high temperatures.

Examples of the alkyl group having at least 5 carbon atoms are pentyl, hexyl, heptyl, octyl, nonyl and decyl groups. Examples of the aralkyl groups having at least 7 carbon atoms include benzyl, 2-phenylprop-2-yl, 2-(p-, m- or o-chlorophenyl)prop-2-yl, 2-(p-, m- or o-fluorophenyl)prop-2-yl, 2-(p-phenylphenyl)prop-2-yl, 2-(p-, m- or o-phenoxyphenyl)prop-2-yl, 2-(p-bromophenyl)-prop-2-yl, 2-(p-iodophenyl)prop-2-yl, 2-(naphthol-1- or -2-yl)prop-2-yl, and 2-[4-, 3-, or 2-)2-$C_{1-3}$ alkyl-prop-2-yl)phenyl]-prop-2-yl.

Accordingly, examples of the mono-substituted hydroquinone include 2-t-amylhydroquinone, 2-5-hexylhydroquinone, 2-5-heptylhydroquinone, 2-t-octylhydroquinone, 2-5-nonylhydroquinone, 2-t-decylhydroquinone, 2-(1,1,4,4-tetramethylphenyl)hydroquinone, 2-(1,1,5,5-tetramethylhexyl)hydroquinone, 2-sec-amylhydroquinone, 2-sec-hexylhydroquinone, 2-sec-heptylhydroquinone, 2-sec-octyl-hydroquinone, 2-(1,5,5-trimethylhexyl)hydroquinone, 2-benzylhydroquinone, 2-α-phenethylhydroquinone, 2-(1-methyl-1-phenylethyl)hydroquinone, 2-(4-methylbenzyl)hydroquinone, 2-[1-(4-methylphenyl)eth-1-yl]hydroquinone, 2-[1-(4-methylphenyl)-1-methylethyl]hydroquinone, (diphenylmethyl)hydroquinone, (phenyl 4-tolylmethyl)hydroquinone, (phenyl 2-butylphenylmethyl)hydroquinone, (1-naphthylmethyl)hydroquinone, 2- naphthylmethyl)hydroquinone, (triphenylmethyl)hydroquinone, (α,α-diphenylethyl)hydroquinone, (α,α-diphenyl-n-propyl)hydroquinone, α-(1-methyl)ethylhydroquinone, α-(2-naphthyl)ethylhydroquinone, cyclopentylhydroquinone, (1-ethylcyclopentyl)hydroquinone, cyclohexylhydroquinone, (1-methylcyclohexyl)hydroquinone, (1-butylcyclohexyl)hydroquinone, and (4-butylcyclohexyl)hydroquinone.

The mono-substituted hydroquinones can be produced by a known method which comprises reacting hydroquinone with an alcohol or an unsaturated compound having an olefinic double bond in the presence of an acid catalyst such as phosphoric or sulfuric acid in an aromatic hydrocarbon such as benzene under heat.

The units (b) derived from the aromatic dihydroxy compound may contain up to about 10 mole% of unsubstituted hydroquinone or a substituted hydroquinone other than the mono-substituted hydroquinone. The other substituted hydroquinones are hydroquinones substituted by an alkyl group preferably having 1 to 4 alkyl groups such as methyl, ethyl, propyl or butyl or a halogen atom such as chlorine or bromine. Specific examples include methylhydroquinone, ethylhydroquinone, t-butylhydroquinone, chlorohydroquinone and bromohydroquinone.

As stated hereinabove, at least 90 mole% of the units (b) should consist of units derived from the mono-substituted hydroquinone, or a mixture of the mono-substituted hydroquinone and unsubstituted hydroquinone or a substituted hydroquinone other than the mono-substituted hydroquinone. Accordingly, up to 10% by weight of the units (b) may contain of units derived from another aromatic dihydroxy compound such as resorcinol, 2,2-bis(4-hydroxyphenyl)propane, bis(4-hydroxyphenyl)sulfone, 1,1-bis(4-hydroxyphenyl)cyclohexane, 4,4'-dihydroxydiphenyl, 4,4'-dihydroxydiphenyl ether and 4-t-butylresorcinol.

Preferably, the units (b) derived from the aromatic dihydroxy compound consist essentially of units derived from the mono-substituted hydroquinone or a mixture of the units derived from the mono-substituted hydroquinone and units derived from unsubstituted hydroquinone or a substituted hydroquinone other than the mono-substituted hydroquinone.

The units (c) derived from the p-oriented aromatic hydrocarboxylic acid forming the wholly aromatic polyester of this invention contain at least about 70 mole% of units derived from p-hydroxybenzoic acid and/or a mono-substituted p-hydroxybenzoic acid. The substituted p-hydroxybenzoic acid is preferably substituted, for example, by an alkyl group having 1 to 4 carbon atoms such as methyl, ethyl, propyl, and butyl or a halogen atom such as chlorine or bromine. Examples include 3-chloro-4-hydroxybenzoic acid, 3-bromo-4-hydroxybenzoic acid, 3,5-dichloro-4-hydroxybenzoic acid, 3-methyl-4-hydroxybenzoic acid and 3-t-butyl-4-hydroxybenzoic acid. Units derived from p-hydroxybenzoic acid are preferred as the units contained in a proportion of at least 70 mole%. The units derived from p-hydroxybenzoic acid and/or the mono-substituted p-hydroxybenzoic acid preferably account for at least 80 mole%, more preferably at least about 90 mole%, of the units (c). It is especially preferred that the units (c) consist essentially of the units derived from p-hydroxybenzoic acid and/or the mono-substituted p-hydroxybenzoic acid.

The units (c) may contain not more than about 30 mole% of units derived from a p-oriented aromatic hydroxycarboxylic acid other than p-hydroxybenzoic acid and/or the mono-substituted p-hydroxybenzoic acid.

The p-oriented aromatic hydroxycarboxylic acid denotes an aromatic hydroxycarboxylic acid in which the relation between the hydroxyl group bonded to the aromatic ring or a group derived from the hydroxyl group and the carboxyl group bonded to the aromatic ring is the same as the relation between the two carboxyl groups described hereinabove with regard to the p-oriented aromatic dicarboxylic acid. Examples of the other p-oriented aromatic hydroxycarboxylic acid include p-(β-hydroxyethoxy)benzoic acid, p-(4-hydroxyphenoxy)benzoic acid, 4-hydroxy-1-naphthoic acid, 6-hydroxy-2-naphthoic acid and p-(4-hydroxyphenyl)benzoic acid.

The wholly aromatic polyester of this invention having melt anisotropy consists essentially of the units (a) and (b), or the units (a), (b) and (c). The latter polyester contains at least about 9 mole%, preferably at least about 20 mole%, more preferably at least about 30 mole%, based on the entire structural units, each of the units derived from the p-oriented aromatic dicarboxylic acid and the units derived from the mono-substituted hydroquinone substituted by an alkyl group having at least 5 carbon atoms or an aralkyl group having at least 7 carbon atoms.

Since as is well known in the art the wholly aromatic polyester of this invention has an ester linkage forming the main chain by the reaction of equal chemical equivalents of the hydroxyl groups and the carboxyl groups, it substantially contains equal chemical equivalents of the units (a) and (b). Accordingly, a wholly aromatic polyester derived, for example, from 10 moles of terephthalic acid, 10 moles of t-amylhydroquinone and 90 moles of p-hydroxybenzoic acid contains the units (a) derived from terephthalic acid and the units (b) derived from t-amylhydroquinone each in an amount of about 9 mole% based on the entire structural units (110 moles).

As can be seen from the above-described constituents, the molecular chains of the wholly aromatic polyesters have excellent linearity and a melt of the polyester has optical anisotropy. Despite this, the wholly aromatic polyester of this invention has a relatively low melting point and a flow initiation temperature, as defined hereinabove of, for example, about 250° to about 360° C. Hence, it has excellent melt shapability, is greatly protected from oxidative decomposition or heat decomposition during melt shaping, and gives various excellent shaped articles.

The wholly aromatic polyester of the invention has especially superior melt shapability and excellent heat stability at high temperatures when it contains units derived from the mono-substituted hydroquinone having an alkyl or aralkyl group as a substituent bonded to the hydroquinone skeleton through a tertiary carbon atom. A wholly aromatic polyester in accordance with this invention which has units derived from the mono-substituted hydroquinone having a substituent bonded to the hydroquinone skeleton through a primary or secondary carbon atom exhibits solubility in organic solvents such as p-chlorophenol, a mixture of phenol and tetrachloroethane, a mixture of p-chlorophenol and tetrachloroethane, a mixture of trifluoroacetic acid and chloroform, and a mixture of trifluoroacetic acid and tetrachloroethane. As can be seen from their solubility in organic solvents, these wholly aromatic polyesters show affinity for various vinyl compounds, and therefore, their molded articles can be treated with vinyl compounds to introduce them into the molded articles. This means that by after-processing, various desired properties such as dimensional stability, oxidation stability and chemical resistance can be imparted to the wholly aromatic polyesters of this invention.

The wholly aromatic polyesters of this invention have an inherent viscosity, measured in its solution in a mixture of p-chlorophenol and tetrachloroethane by the method defined hereinbelow, of preferably at least 0.8, more preferably at about 2.0, especially preferably at least 3.0.

The term "melt anisotropy", as used herein, means that a polymer is optically anisotropic in the molten state. For example, Japanese Laid-Open Patent Publication No. 109598/1978 describes in detail the properties of wholly aromatic polyesters which show melt anisotropy.

The "melt-anisotropic" wholly aromatic polyesters of this invention can be produced by various methods, for example a method which comprises polycondensing the required components under heat in the presence of an aryl carbonate, and a method which comprises polycondensing under heat the required components in which at least one of the aromatic dicarboxylic acid, aromatic dihydroxy compound and p-oriented aromatic hydrocarboxylic acid is in the form of an ester.

Preferred embodiments which are encompassed within these methods will be described below by taking up an example of producing a wholly aromatic polyester composed of units derived from terephthalic acid, t-amylhydroquinone and p-hydroxybenzoic acid.

(1) A method which comprises adding an aryl carbonate such as diphenyl carbonate to terephthalic acid and p-hydroxybenzoic acid, esterifying the mixture by heating, and polycondensing the ester together with t-amylhydroquinone under heat (to be referred to as a first method).

(2) A method which comprises polycondensing a mixture of phenyl p-hydroxybenzoate, diphenyl terephthalate and t-amylhydroquinone under heat (to be referred to as a second method).

The first method will be specifically described below. The aryl carbonate may be a polycarbonate such as diphenyl carbonate, ditolyl carbonate, di-p-chlorophenyl carbonate, phenyltolyl carbonate and poly-tert.-amylphenylene carbonate. Of these, diphenyl carbonate is preferred in view of the stability of its quality, and its purity and reactivity. The amount of the aryl carbonate is preferably 0.9 to 1.1 equivalents, especially about 1 equivalent, as the bound carbonate per equivalent of the free carboxyl groups of terephthalic acid and p-hydroxybenzoic acid.

The reaction is carried out at a temperature of usually 200° to 300° C., preferably 200° to 280° C. until evolution of carbon dioxide gas formed by the reaction substantially ceases. The suitable reaction time is 1 to 6 hours, and preferably, the reaction is carried out in the presence of a catalyst. Examples of the catalyst include titanium compounds such as titanium tetrabutoxide, titanyl oxalate and titanium acetate; tin compounds such as stannous acetate; and compounds containing such metals as lead, antimony, bismuth, cerium, lanthanum, lithium, sodium, potassium, zinc, magnesium and calcium, for example zinc carbonate, lead oxide, antimony trioxide, antimony pentoxide, bismuth trioxide, cerium acetate, lanthanum oxide, lithium oxide, potassium benzoate, calcium acetate, magnesium oxide, and magnesium acetate. Among these, the titanium, tin and antimony compounds are preferred because they can also be used in the subsequent polycondensation reaction. The amount of the catalyst used is generally 0.005 to 0.5 mole%, preferably 0.01 to 0.1 mole%, based on terephthalic acid.

After the reaction between terephthalic acid and the aryl carbonate is completed, 1.0 to 1.3 moles, preferably 1.01 to 1.2 moles, per mole of terephthalic acid, of t-amylhydroquinone is added to the reaction mixture while the temperature of the reaction system is maintained at 200° to 280° C. Then, the polycondensation of the mixture is carried out.

The polycondensation reaction proceeds substantially in the absence of a catalyst, but it is preferred to use a known ester-interchange catalyst. Preferably, such ester-interchange catalysts include compounds containing metals such as calcium, magnesium, strontium, barium, lanthanum, cerium, manganese, cobalt, zinc, germanium, tin, lead, antimony and bismuth. Specific examples are magnesium acetate, calcium bezoate, strontium acetate, barium propionate, lanthanum carbonate, cerium oxide, manganese acetate, cobalt acetate, zinc acetate, germanium oxide, stannous acetate, lead oxide, antimony trioxide and bismuth trioxide.

It is also preferred to use a stabilizer together with such an ester-interchange (polycondensation) catalyst. Examples of suitable stabilizers are known trivalent or pentavalent phosphorus compounds and their esters, such as phosphorus acid, phosphoric acid, phenylphosphonic acid, methylphosphonic acid, ethylphosphonic acid, propylphosphonic acid, butylphosphonic acid, benzylphosphonic acid, trimethyl phosphite, trimethyl phosphate, triethyl phosphate, tributyl phosphate, triphenyl phosphite, triphenyl phosphate, diethyl phenylphosphonate, dimethyl (methyl)phosphonate, dimethyl (ethyl)phosphate, and dimethyl (benzyl)phosphate. These stabilizers improve the melt stability and color of the polymer, but may inactivate some types of the polycondensation catalyst. If the stabilizer is likely to inactivate the catalyst, it is preferably added after the end of the polycondensation reaction. When an antimony- or germanium-containing polycondensation catalyst is used, the stabilizer can be added from the outset of the polycondensation, because it will not be inactivated by the stabilizer.

The amount of the ester-interchange (polycondensation) catalyst is preferably 0.005 to 0.5 mole%, especially preferably 0.01 to 0.1 mole%, based on terephthalic acid and p-hydroxybenzoic acid. Preferably, the amount (P moles) of the stabilizer has the following relation to the amount (N moles) of the polycondensation catalyst.

$$0.8 < P/N < 1.5$$

After adding such amounts of the catalyst and t-amylhydroquinone and optionally the stabilizer, the mixture is reacted, for example, at 250° to 300° C. under atmospheric pressure. The polycondensation is carried out while distilling off the resulting monohydroxy aromatic compound (e.g., phenol) out of the reaction system. While distilling off the resulting monohydroxy aromatic compound out of the reaction system, the polycondensation reaction is carried out first under atmospheric pressure and then under reduced pressure.

The reaction under atmospheric pressure is carried out preferably by successively raising the reaction temperature. Preferably, this reaction is carried out at the lowest possible temperature so long as the aromatic monohydroxy compound can be distilled off. The polycondensation reaction proceeds slowly even at a temperature of not more than 250° C. Since at this temperature the resulting aromatic monohydroxy compound is hardly distilled off, the polycondensation reaction soon reaches equilibrium.

In practice, therefore, it is preferred that the polycondensation be started at a reaction temperature of about 260° C., and the temperature be gradually raised so that it reaches about 290° C. when the proportion of the aromatic monohydroxy compound distilled amounts to about 35 to 60% of theory. If the reaction temperature is carried out at 290° C. or higher from the outset, undesirable side-reactions such as gellation would take place. Preferably, after distilling off such an amount of the aromatic monohydroxy compound out of the reaction system, the pressure of the reaction system is reduced, and while further distilling off the resulting aromatic monohydroxy compound, the reaction temperature and the degree of pressure reduction are gradually increased, and finally the reaction is carried out at a reaction temperature of 320° to 340° C. under a pressure of about 1 mmHg or below to give a polymer having a predetermined degree of polymerization.

The second method will now be described. Phenyl p-hydroxybenzoate and diphenyl terephthalate used in this method can be produced in a conventional manner by, for example, reacting p-hydroxybenzoic acid or terephthalic acid with diphenyl carbonate or phenol.

The mixture of phenyl p-hydroxybenzoate, diphenyl terephthalate and t-amylhydroquinone is polycondensed under heat by employing quite the same conditions as described above for the polycondensation in the first method.

Since according to the second method phenyl p-hydroxybenzoate and diphenyl terephthalate can be reacted with tert-amylhydroquinone in a highly pure state, the quality of the resulting wholly aromatic polyester shows a further improvement. For this reason, the second method is preferred to the first one.

The resulting wholly aromatic polyesters of the invention are characterized by the fact that despite their melt anisotropy, they have a relatively low melting point and a low flow initiation temperature, and therefore can be easily melt-shaped from their optically anisotropic melt.

Accordingly, the present invention also provides a process for producing films or fibers of a wholly aromatic polyester having melt anisotropy, which comprises melting said polyester by heating to form an optically anisotropic melt, and converting the melt into films or fibers by melt shaping methods known per se.

Since conventional wholly aromatic polyesters having melt anisotropy generally have relatively high melting points and high flow initiation temperatures, a temperature range is very narrow within which a stable melt of the polyester can be formed without heat decomposition, and the melt obtained has a relatively high melt viscosity. It has been difficult or impossible therefore to produce molded shaped articles having excellent mechanical properties by melt-shaping methods.

The above process for producing films or fibers can be especially advantageously performed when the wholly aromatic polyester used contains units derived from a mono-substituted hydroquinone having an aralkyl group with at least 5 carbon atoms or an aralkyl group with at least 7 carbon atoms bonded to the hydroquinone skeleton through a tertiary carbon atom.

According to the process of this invention, the wholly aromatic polyester is heated to a temperature between its melting point and its decomposition temperature to form an optically anisotropic melt. Generally, the heating temperature is preferably between the flow initiation temperature of the wholly aromatic polyester and a temperature about 50° C. higher than its melting point.

Since the wholly aromatic polyester of this invention preferably has a flow initiation temperature between about 250° and 360° C., it can be melted and shaped at a temperature of, for example, less than about 400° C., generally from about 300° C. to about 400° C.

According to the process of this invention, shaped articles in various forms can be produced from the wholly aromatic polyesters of this invention. More specifically, fibers can be produced by melting the wholly aromatic polyester at a temperature of, for example, 300° to 400° C., extruding the melt through a spinneret and winding the resulting filaments at a rate of 10 to 500 m/min. at a draft ratio of 5 to 500. The resulting polyester fibers need not always to be subjected to drawing and heat treatment. Melt-spinning and subsequent windup can give filaments having a tenacity of as high as 5 g/de or more and a Young's modulus of as high as 2500 kg/mm$^2$ or more. If these filaments are heat-treated, for example, at 200° to 300° C. for 10 hours while retaining their shape, their tenacity can be increased to several times. The resulting fibers can be advantageously used in tire cords, rubber reinforcing materials, fillers, and other heat-resistant industrial materials.

A film of the wholly aromatic polyester can be produced by melt-extruding it through a die at a temperature of, for example, 300° to 400° C., and winding the extrudate about a drum. Any known film-forming machine can be used for this purpose. The draft ratio during extrusion is generally 1 to 50, preferably 1 to 10. The film extruded onto the drum may be allowed to cool at ordinary temperature, or quenched in water. As required, the resulting polyester film may be biaxially stretched by methods and devices known per se. Usually, the biaxial stretching can be carried out in the machine direction and a direction at right angles thereto both at a stretch ratio of about 1.1 to about 5. The biaxial stretching can be carried out at a temperature of about 150° C. to about 250° C.

The film obtained by the process of this invention, even in the unstretched state, has a Young's modulus of at least about 700 kg/mm$^2$ and a strength of at least about 30 kg/mm$^2$.

The film according to this invention having such a high strength and Young's modulus can be used as magnetic tapes, films for vapor deposition of metals, films for flexible printed circuits, and electrical insulting films by utilizing its excellent mechanical properties.

The wholly aromatic polyesters of this invention, above all one containing units derived from a mono-substituted hydroquinone having a substitutent bonded to the hydroquinone skeleton through a primary or secondary carbon atom, are soluble in organic solvents as stated hereinabove. Accordingly, it is also possible to prepare a dope of such a wholly aromatic polyester in an organic solvent, and convert the dope into a film by a known method, for example a casting method. The resulting film also has a high strength and a high Young's modulus as does the film obtained by the melt-shaping method.

The following examples illustrate the present invention more specifically.

All parts in these examples are by weight.

The inherent viscosity of the wholly aromatic polyester is determined as follows:

Ten milligrams of the polyester is dissolved in 10 ml of a mixed solvent (a mixture of p-chlorophenol and tetrachloroethane in a weight ratio of 4:6), and its relative viscosity ($\eta_r$) is measured at 50° C. by an Ostwald viscometer. The inherent viscosity is calculated from the following equation.

Inherent viscosity = $(\ln \eta_r / 0.1)$

The flow initiation temperature is determined as follows: The wholly aromatic polyester is put in a Koka-type flow tester equipped with a nozzle having a diameter of 0.5 mm and a length of 4 mm, and the temperature is raised at a rate of about 2° C. per minute under a pressure of 60 kg/cm². The temperature at which the polyester begins to flow from the nozzle is measured and defined as the flow initiation temperature.

The density of the polyester is measured by means of a pycnometer using mixed solvent of carbon tetrachloride and n-hexane after crystallizing the polyester by heating at 200° C. for 3 hours.

Hydrolysis resistance is determined as follows: The polyester sample (1.0 g) is heat-treated at 240° C. for 15 hours to crystallize it, and then the crystallized polymer is sealed up in a tube together with 10 ml of distilled water. The tube is heat-treated at 120° C. for 48 hours, and the inherent viscosity $(\eta_{inh})_o$ of the polymer before the heat-treatment and the inherent viscosity $(\eta_{inh})$ of the polymer after the heat-treatment are measured. Hydrolysis resistance is given by the following equation.

$$\text{Hydrolysis resistance (\%)} = \left[ \frac{(\eta_{inh})}{(\eta_{inh})_o} \right] \times 100$$

EXAMPLE 1

Phenyl p-hydroxybenzoate (214 parts), 318 parts of diphenyl terephthalate, 198 parts of tert-amylhydroquinone and 0.1 part of antimony trioxide were reacted under atmospheric pressure for 30 minutes at 260° C., then for 30 minutes at 270° C. and further for 30 minutes at 290° C. while distilling off the resulting phenol. Subsequently, the polycondensation was carried out while gradually raising the temperature, increasing the degree of pressure reduction at a rate of 100 mmHg/20 minutes, and distilling off the phenol. Finally, the polycondensation was carried out at 330° C. and about 1 mmHg for 20 minutes.

The resulting polyester had a flow initiation temperature of 265° C. and an inherent viscosity of 3.6. The polyester was melted at 350° C., extruded by using a spinning apparatus having a spinneret with a nozzle diameter of 0.3 mm, and wound up at a rate of 50 m/min. and a draft of 20. The resulting filaments had a size of 40 denier, a tenacity of 7 g/de, a Young's modulus of 5,000 kg/mm² and an elongation of 2%.

EXAMPLES 2 TO 4

The starting materials shown in Table 1 were reacted in the same way as in Example 1 to form polyesters. Each of the polyesters was melt-spun in the same way as in Example 1.

TABLE 1

| Example | Diphenyl terephthalate | Phenyl p-hydroxybenzoate (parts) | t-amylhydroquinone (parts) |
|---|---|---|---|
| 2 | 508.8 | 85.6 | 317.6 |
| 3 | 445.2 | 128.4 | 277.2 |
| 4 | 254.4 | 256.8 | 158.2 |

Table 2 summarizes the flow initiation temperatures and inherent viscosities of the resulting polyesters and the properties of the resulting filaments.

TABLE 2

| Example | Flow initiation temperature (°C.) | Inherent viscosity | Size (denier) | Tenacity (g/de) | Young's modulus (kg/mm²) |
|---|---|---|---|---|---|
| 2 | 290 | 2.7 | 45 | 6.5 | 5,500 |
| 3 | 285 | 3.0 | 51 | 5.3 | 5,000 |
| 4 | 267 | 5.1 | 35 | 7.2 | 5,050 |

EXAMPLES 5 TO 7

The starting materials shown in Table 3 were reacted, and the resulting polyesters were spun, as in Example 1.

TABLE 3

| Example | Diphenyl terephthalate (parts) | Phenyl p-hydroxybenzoate (parts) | Tertiary alkyl-substituted hydroquinone (parts) | |
|---|---|---|---|---|
| 5 | 254.4 | 256.8 | t-Heptylhydroquinone | (183.0) |
| 6 | 254.4 | 256.8 | t-Octylhydroquinone | (195.4) |
| 7 | 508.8 | 85.6 | t-Octylhydroquinone | (390.7) |

Table 4 summarizes the properties of the resulting polyesters and the filaments.

TABLE 4

| Example | Flow initiation temperature (°C.) | Inherent viscosity | Size (denier) | Tenacity (g/de) | Young's modulus (kg/mm²) |
|---|---|---|---|---|---|
| 5 | 280 | 3.2 | 50 | 5.1 | 5,000 |
| 6 | 225 | 1.4 | 41 | 4.5 | 3,500 |
| 7 | 240 | 1.1 | 36 | 4.4 | 3,600 |

EXAMPLES 8 TO 10

The starting materials shown in Table 5 were reacted, and the resulting polyesters were spun, in the same way as in Example 1.

TABLE 5

| Example | Diphenyl terephthalate (parts) | Diphenyl isophthalate (parts) | t-Amyl-hydroquinone (parts) | t-Heptyl-hydroquinone (parts) |
|---|---|---|---|---|
| 8 | 286.2 | 31.8 | 198 | — |
| 9 | 302.1 | 15.9 | 198 | — |
| 10 | 302.1 | 15.9 | — | 228.8 |

Table 6 summarizes the properties of the polyesters and the filaments. (In Example 8, the spinning was carried out at 380° C.)

TABLE 6

| Example | Flow initiation temperature (°C.) | Inherent viscosity | Size (denier) | Tenacity (g/de) | Young's modulus (kg/mm²) |
|---|---|---|---|---|---|
| 8 | 310 | 1.87 | 40 | 5.5 | 4500 |
| 9 | 320 | 1.96 | 45 | 6.0 | 5000 |
| 10 | 305 | 1.90 | 41 | 6.0 | 4800 |

EXAMPLE 11

Diphenyl terephthalate (318 parts), 250 parts of 2-(1-methyl-1-phenyl ethyl)hydroquinone and 0.1 part of antimony trioxide were reacted under atmospheric pressure for 30 minutes at 260° C., then for 30 minutes at 270° C. and further for 30 minutes at 290° C. while distilling off the phenol generated. Then, while gradually raising the temperature, increasing the degree of pressure reduction at a rate of 100 mmHg per 20 minutes, and distilling off the phenol, the polycondensation reaction was performed. Finally, the polycondensation was performed for 20 minutes at 330° C. and about 1 mmHg.

The resulting polyester had a flow initiation temperature of 305° C. and an inherent viscosity of 4.7.

The polyester was melted at 350° C., extruded by using a spinning apparatus having a spinneret with a nozzle diameter of 0.3 mm, and wound up at a rate of 50 m/min. and a draft of 20. The resulting filaments had a size of 40 denier, a tenacity of 7.2 g/de, a Young's modulus of 5,200 kg/mm² and an elongation of 2.4%.

The polyester also had a density of 1.203 and a hydrolysis resistance of 91%.

EXAMPLES 12 TO 14

The starting materials shown in Table 7 were reacted, and the resulting polyesters were melt-spun, in the same way as in Example 11.

TABLE 7

| Example | Diphenyl terephthalate (parts) | Phenyl p-hydroxybenzoate (parts) | 2-(1-methyl-1-phenyl ethyl)-hydroquinone (parts) |
|---|---|---|---|
| 12 | 508.8 | 85.6 | 401 |
| 13 | 445.2 | 128.4 | 351 |
| 14 | 254.4 | 256.8 | 200.6 |

Table 8 summarizes the properties of the polyesters and the filaments.

TABLE 8

| Example | Flow initiation temperature (°C.) | Inherent viscosity | Density | Hydrolysis resistance (%) | Size (denier) | Tenacity (g/de) | Young's modulus (kg/mm²) |
|---|---|---|---|---|---|---|---|
| 12 | 285 | 3.2 | 1.208 | 91 | 46 | 6.4 | 5,600 |
| 13 | 270 | 4.6 | 1.211 | 90 | 50 | 5.5 | 5,800 |
| 14 | 260 | 3.8 | 1.261 | 85 | 38 | 7.1 | 5,750 |

EXAMPLES 15 TO 30

By the same method as in Example 1, the wholly aromatic polyesters shown in Table 9 were prepared. Each of the polyesters shown in Table 9 contained equimolar proportions of the units indicated.

TABLE 9

| Example | Wholly aromatic polyester | Inherent viscosity | Flow initiation temperature (°C.) |
|---|---|---|---|
| 15 | $-[O-C_6H_3(CH(C_2H_5)C_6H_{13})-O]-$ $-[CO-C_6H_4-CO]-$ | 1.6 | 320 |
| 16 | $-[O-C_6H_3(CH(C_2H_5)C_6H_{13})-O]-$ $-[CO-C_6H_4-CO]-$ $-[O-C_6H_3(CH_3)-CO]-$ | 3.1 | 295 |
| 17 | $-[O-C_6H_3(C_6H_{11})-O]-$ $-[CO-C_6H_4-CO]-$ (cyclohexyl substituent) | 1.7 | 330 |
| 18 | $-[O-C_6H_3(C_6H_{11})-O]-$ $-[CO-C_6H_4-CO]-$ (cyclohexyl substituent) | 1.6 | 320 |
| 19 | $-[O-C_6H_3(CH(C_4H_9)(C_6H_{11}))-O]-$ $-[CO-C_6H_4-CO]-$ | 2.1 | 345 |

TABLE 9-continued

| Example | Wholly aromatic polyester | Inherent viscosity | Flow initiation temperature (°C.) |
|---|---|---|---|
| 20 | –[O–⌬–O]– –[CO–⌬–CO]– (substituent: CH$_2$–Ph) | 1.8 | 350 |
| 21 | –[O–⌬–O]– –[CO–⌬–CO]– (substituent: CH$_3$–CH–Ph) | 1.9 | 325 |
| 22 | –[O–⌬–O]– –[CO–⌬–CO]– –[O–⌬(Cl)–CO]– (substituent: CH$_3$–CH–Ph) | 2.7 | 295 |
| 23 | –[O–⌬–O]– –[CO–⌬–CO]– (substituent: CH–(Ph)$_2$) | 1.5 | 345 |
| 24 | –[O–⌬–O]– –[CO–⌬–CO]– –[O–⌬(t-C$_4$H$_9$)–CO]– (substituent: CH–(Ph)$_2$) | 2.6 | 315 |
| 25 | –[O–⌬–O]– –[CO–⌬–CO]– (substituent: CH$_2$–naphthyl) | 1.9 | 340 |
| 26 | –[O–⌬–O]– –[CO–⌬–CO]– (substituent: C–(Ph)$_3$) | 1.0 | 330 |
| 27 | –[O–⌬–O]– –[CO–naphthalene–CO]– (substituent: CH$_3$–CH–Ph) | 1.6 | 335 |
| 28 | –[O–⌬–O]– –[CO–⌬–⌬–CO]– (substituent: CH$_3$–C(C$_2$H$_5$)(CH$_3$)–) | 1.6 | 345 |
| 29 | –[O–⌬–O]– [⌬–⌬ with CO– and –CO] (substituent: CH$_3$–CH–C$_4$H$_9$) | 1.7 | 330 |

TABLE 9-continued

| Example | Wholly aromatic polyester | Inherent viscosity | Flow initiation temperature (°C.) |
|---|---|---|---|
| 30 | 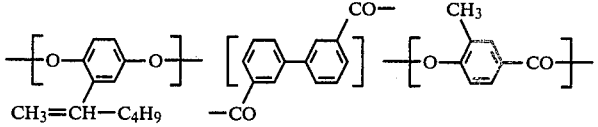 | 2.0 | 295 |

EXAMPLES 31 TO 33

A wholly aromatic polyester obtained in the same way as in Example 11 and having the same composition as in Example 11 and an inherent viscosity of 4.7, the wholly aromatic polyester obtained in Example 21 having an inherent viscosity of 1.9, and the wholly aromatic polyester obtained in Example 24 having an inherent viscosity of 2.6 were each pulverized to a size of about 10 to 16 mesh, gradually heated from 200° to 290° C. over the course of 5 hours, and then heated in a nitrogen stream at 290° C. for 5 hours to perform solid-phase polymerization to give polymer A having an inherent viscosity of 5.5, polymer B having an inherent viscosity of 6.4 and polymer C having an inherent viscosity of 5.7.

Each of these wholly aromatic polyesters was dissolved in a 4:6 (by weight) mixture of p-chlorophenol and 1,1,2,2-tetrachloroethane at 140° C. to prepare a 3% by weight dope.

The dope was cast on a glass plate, and the glass plate was dipped in a large amount of acetone to remove most of the solvent of the dope and thus to obtain a self-supporting film. The film was fixed by a metal frame, and dried and heat-treated in vacuum for 5 hours at 60° C., for 5 hours at 100° C. and further for 5 hours at 150° C. to give a film having a thickness of about 30 microns.

The properties of the aromatic polyester films are shown in Table 10.

TABLE 10

| Example | Wholly aromatic polyester | Strength (kg/mm²) | Elongation (%) | Young's modulus (kg/mm²) |
|---|---|---|---|---|
| 31 | Polymer A | 20 | 17 | 1020 |
| 32 | Polymer B | 25 | 20 | 1120 |
| 33 | Polymer C | 17 | 10 | 970 |

What we claim:

1. A fiber-or film-forming wholly aromatic polyester having melt anisotropy, said polyester consisting essentially of
    (1) units (a) of a divalent aromatic dicarboxylic acid residue, at least 90 mole% of said acid consisting of a p-oriented aromatic dicarboxylic acid and units (b) of a divalent aromatic dihydroxy compound residue, at least about 90 mole% of said compound consisting of a mono-substituted hydroquinone ring-substituted by an alkyl group having at least 5 carbon atoms or an aralkyl group having at least 7 carbon atoms or a mixture of said mono-substituted hydroquinone and unsubstituted hydroquinone or a substituted hydroquinone other than said mono-substituted hydroquinone, the proportion of said mono-substituted hydroquinone being at least 80 mole%; or
    (2) said units (a) and (b), and units (c) of a divalent p-oriented aromatic hydroxycarboxylic acid residue, at least about 70 mole% of said hydroxycarboxylic acid consisting of p-hydroxybenzoic acid, a mono-substituted p-hydroxybenzoic acid ring substituted by an alkyl group having 1 to 4 carbon atoms or a halogen atom, or mixtures thereof, the proportion of the units of the divalent p-oriented aromatic dicarboxylic acid residue and the units of the divalent mono-substituted hydroquinone residue each being at least about 9 mole% based on the entire structural units of the polyester.

2. The wholly aromatic polyester of claim 1 wherein the mono-substituted hydroquinone is ring-substituted by said alkyl group and the alkyl group substituted at the hydroquinone has 5 to 10 carbon atoms.

3. The wholly aromatic polyester of claim 1 wherein the mono-substituted hydroquinone is ring-substituted by said aralkyl group and the aralkyl group substituted at the hydroquinone has 7 to 15 carbon atoms.

4. The wholly aromatic polyester of claim 1 wherein the alkyl group having at least 5 carbon atoms or the aralkyl group having at least 7 carbon atoms is bonded to the hydroquinone skeleton through a tertiary carbon atom.

5. The wholly aromatic polyester of claim 1 wherein said substituted hydroquinone other than the mono-substituted hydroquinone is mono-substituted by an alkyl group having 1 to 4 carbon atoms or a halogen atom.

6. The wholly aromatic polyester of claim 1 wherein the p-oriented aromatic dicarboxylic acid is terephthalic acid, 4,4'-diphenyldicarboxylic acid, 2,6-naphthalenedicarboxylic acid, 1,5-naphthalenedicarboxylic acid, chloroterephthalic acid, bromoterephthalic acid or methylterephthalic acid.

7. The wholly aromatic polyester of claim 1 wherein the units (b) consist essentially of the divalent residue of the mono-substituted hydroquinone, or both the mono-substituted hydroquinone and the unsubstituted hydroquinone or the substituted hydroquinone other than the mono-substituted hydroquinone.

8. The wholly aromatic polyester of claim 1 wherein the units (a) consist essentially of the divalent residue of p-oriented aromatic dicarboxylic acid.

9. The wholly aromatic polyester of claim 1 wherein the units (c) consist essentially of the divalent residue of p-hydroxybenzoic acid, the mono-substituted p-hydroxybenzoic acid or mixtures thereof.

10. The wholly aromatic polyester of claim 1 which has an inherent viscosity of at least 0.8 measured at 50° C. using a solution of 10 mg of the polyester and 10 ml of a mixed solvent of p-chlorophenol and tetrachloroethane in a weight ratio of 4:6.

11. The wholy aromatic polyester of claim 1 which has a flow initiation temperature in the range of about 250° to about 360° C.

12. A film or fiber composed of the wholly aromatic polyester set forth in claim 1.

13. A film according to claim 12 which is unstretched or biaxially stretched.

14. The film of claim 13 which has at least one direction in which the Young's modulus is at least about 700 kg/mm$^2$.

15. A fiber according to claim 12 which has a Young's modulus of at least about 2,500 kg/mm$^2$.

16. The wholly aromatic polyester of claim 1 wherein said polyester consists essentially of (1) the polycondensation reaction product of (a) an aromatic dicarboxylic acid of which at least 90 mole% is a p-oriented aromatic dicarboxylic acid selected from the group consisting of terephthalic acid, chloroterephthalic acid, bromoterephthalic acid, 2,5-dibromoterephthalic acid, methylterephthalic acid, 1,4-naphthalenedicarboxylic acid, 1,5-naphthalenedicarboxylic acid, 2,6-naphthalenedicarboxylic acid, 4,4'-diphenyldicarboxylic acid, 3,3'-diphenyldicarboxylic acid, 3,3'-dibromo-4,4'-diphenyldicarboxylic acid, the esters thereof and the mixtures thereof, and up to about 10 mole% of which is a m-oriented aromatic dicarboxylic acid selected from the group consisting of isophthalic acid, 1,3-naphthalenedicarboxylic acid, 1,6-naphthalenedicarboxylic acid, 1,7-naphthalenedicarboxylic acid, 2,7-naphthalenedicarboxylic acid, 3,4'-diphenyldicarboxylic acid, 4-methylisophthalic acid, 5-methylisophthalic acid, 5-tert-butylisophthalic acid, 5-methoxyisophthalic acid and naphthalene-2,7-dichloro-1,6-dicarboxylic acid or an aromatic dicarboxylic acid in which a plurality of benzene rings are bonded through a hetero atom and selected from the group consisting of diphenylether-4,4'-dicarboxylic acid, diphenylether-3,4'-dicarboxylic acid, diphenoxyethane-4,4'-dicarboxylic acid, diphenoxyethane-3,4'-dicarboxylic acid, and diphenylether-4,4'-dichloro-3,3'-dicarboxylic acid with (b) an aromatic dihydroxy compound at least about 90 mole% of which consists of a mono-substituted hydroquinone ring-substituted by an alkyl group having at least 5 carbon atoms or an aralkyl group having at least 7 carbon atoms, said mono-substituted hydroquinone being selected from the group consisting of 2-t-amylhydroquinone, 2-5-hexyl-hydroquinone, 2-5-heptylhydroquinone, 2-t-octylhydroquinone, 2-5-nonylhydroquinone, 2-6-decylhydroquinone, 2-(1,1,4,4-tetramethylphenyl)hydroquinone, 2-(1,1,5,5-tetramethylhexyl)hydroquinone, 2-sec-amylhydroquinone, 2-sec-hexylhydroquinone, 2-sec-heptylhydroquinone, 2-sec-octyl-hydroquinone, 2-(1,5,5-trimethylhexyl)hydroquinone, 2-benzylhydroquinone, 2-α-phenethylhydroquinone, 2-(1-methyl-1-phenylethyl)hydroquinone, 2-(4-methylbenzyl)hydroquinone, 2-(1-(4-methylphenyl)ethyl-1-yl)hydroquinone, 2-(1-(4-methylphenyl)-1-methylether)hydroquinone, (diphenylmethyl)hydroquinone, (phenyl 4-tolylmethyl)hydroquinone, (phenyl 2-butylphenylmethyl)hydroquinone, (1-naphthylmethyl)hydroquinone, (2-naphthylmethyl)hydroquinone, (triphenylmethyl)hydroquinone, (α,α-diphenylethyl)hydroquinone, (α,α-diphenyl-n-propyl)hydroquinone, α-(1-methyl)ethylhydroquinone, α-(2-naphthyl)ethylhydroquinone, cyclopentylhydroquinone, (1-ethylcyclopentyl)hydroquinone, cyclohexylhydroquinone, (1-methylcyclohexyl)hydroquinone, (1-butylcyclohexyl)hydroquinone, (4-butylcyclohexyl)hydroquinone, and esters thereof or a mixture of said mono-substituted hydroquinone and unsubstituted hydroquinone or a mixture of said mono-substituted hydroquinone and a substituted hydroquinone other than said mono-substituted hydroquinone selected from the group consisting of methylhydroquinone, ethylhydroquinone, t-butylhydroquinone, chlorohydroquinone, and bromohydroquinone, the proportion of said mono-substituted hydroquinone being at least 80 mole%; or (2) the polycondensation reaction product of said (a) and (b) and (c) a p-oriented aromatic hydroxycarboxylic acid of whcih at least about 70 mole% consists of p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t-butyl-4-hydroxybenzoic acid, the esters thereof or mixtures thereof and not more than about 30 mole% of a p-oriented aromatic hydroxycarboxylic acid selected from the group consisting of p-(β-hydroxyethoxy)benzoic acid, p-(4-hydroxyphenoxy)benzoic acid, 4-hydroxy-1-naphthoic acid, 6-hydroxy-2-naphthoic acid, p-(4-hydroxyphenyl)benzoic acid, and esters thereof, the proportion of the p-oriented aromatic dicarboxylic acid and the proportion of the mono-substituted hydroquinone each being at least about 9 mole%, based on the entire structural units of the polyester.

17. The wholly aromatic polyester of claim 1 which consists essentially of the polycondensation reaction product of (a) terephthalic acid or an ester thereof with (b) said mono-substituted hydroquinone ring-substituted by an alkyl group having 5 to 10 carbon atoms or an aralkyl group having 7 to 15 carbon atoms; or the polycondensation reaction product of said (a) and (b) and (c) p-hydroxybenzoic acid, 3-chloro-4-hydroxybenzoic acid, 3-bromo-4-hydroxybenzoic acid, 3,5-dichloro-4-hydroxybenzoic acid, 3-methyl-4-hydroxybenzoic acid, 3-t-butyl-4-hydroxybenzoic acid or the esters thereof.

* * * * *